(12) United States Patent
Huang

(10) Patent No.: US 12,402,722 B2
(45) Date of Patent: Sep. 2, 2025

(54) SUPPORTING ASSEMBLY AND SUPPORTING FRAME THEREOF

(71) Applicants: Shenzhen Lemore Marketing Consultancy Co.,Ltd, Shenzhen (CN); Jiecong Li, Shenzhen (CN)

(72) Inventor: Chenglan Huang, Shenzhen (CN)

(73) Assignees: Shenzhen Lemore Marketing Consultance Co., Ltd, Shenzhen (CN); Jiecong Li, Shenzhen (CN)

( * ) Notice: Subject to any disclaimer, the term of this patent is extended or adjusted under 35 U.S.C. 154(b) by 0 days.

(21) Appl. No.: 18/572,166

(22) PCT Filed: Jun. 24, 2022

(86) PCT No.: PCT/CN2022/101245
§ 371 (c)(1),
(2) Date: Dec. 19, 2023

(87) PCT Pub. No.: WO2022/268211
PCT Pub. Date: Dec. 29, 2022

(65) Prior Publication Data
US 2024/0115039 A1    Apr. 11, 2024

(30) Foreign Application Priority Data
Jun. 24, 2021 (CN) .......................... 202121438317.5

(51) Int. Cl.
*A47B 23/04* (2006.01)
(52) U.S. Cl.
CPC .......... *A47B 23/044* (2013.01); *A47B 23/043* (2013.01); *A45C 2200/15* (2013.01); *A47B 2023/049* (2013.01)
(58) Field of Classification Search
CPC ................ A47B 23/044; A47B 23/043; A47B 2023/049; A45C 2200/15; F16M 11/38
(Continued)

(56) References Cited

U.S. PATENT DOCUMENTS 5,722,628 A * 3/1998 Menaged ............. A47B 23/043
                                                         248/455
8,434,601 B2 * 5/2013 Hou ...................... A45C 13/02
                                                         248/455
(Continued)

FOREIGN PATENT DOCUMENTS

CN        211145816 U  *  7/2020
CN        211779986 U  * 10/2020 .............. H04M 1/04
(Continued)

OTHER PUBLICATIONS

Translation of CN-211145816-U (Year: 2020).*

*Primary Examiner* — Taylor Morris
(74) *Attorney, Agent, or Firm* — IPro, PLLC

(57) ABSTRACT

Disclosed is a support frame, comprising: a base plate for supporting the support frame; a connecting plate for attaching to and fixing the base plate; a back plate, wherein a first bending part is provided between the back plate and the connecting plate; a support plate, wherein a second bending part is provided between the support plate and the back plate, a third bending part is provided between the support plate and the base plate, and the first, second and third bending parts are parallel; and when the support frame is bent and deformed through the first, second and third bending parts, the support plate and the back plate are erected, the connecting plate is attached and connected to the base plate, and an included angle is formed between the support plate and the back plate. A support assembly is further disclosed.

7 Claims, 4 Drawing Sheets

(58) Field of Classification Search
USPC .................................................. 248/174, 459
See application file for complete search history.

(56) References Cited

U.S. PATENT DOCUMENTS

| | | | | |
|---|---|---|---|---|
| 8,746,446 B2* | 6/2014 | Chiang | ................ | G06F 1/1628 |
| | | | | 206/320 |
| 9,489,015 B2* | 11/2016 | Gioscia | ................ | A45C 11/00 |
| 9,545,139 B2* | 1/2017 | Kim | ................ | A45C 11/00 |
| 9,671,057 B2* | 6/2017 | Lin | ................ | F16M 11/10 |
| 9,730,345 B2* | 8/2017 | Wu | ................ | F16M 13/00 |
| 10,211,874 B2* | 2/2019 | Kao | ................ | A45C 13/1069 |
| 10,302,243 B1* | 5/2019 | Scholz | ................ | A47B 23/04 |
| 10,606,314 B1* | 3/2020 | Takano | ................ | F16M 11/2021 |
| 10,842,237 B2* | 11/2020 | Takano | ................ | A47B 23/044 |
| 11,169,576 B2* | 11/2021 | Campbell | ............ | G06F 1/1637 |
| D1,025,998 S* | 5/2024 | He | ................ | D14/447 |
| 2004/0240164 A1* | 12/2004 | Lee | ................ | G06F 1/1616 |
| | | | | 361/679.55 |
| 2008/0230672 A1* | 9/2008 | Pachowski | ............ | A47B 23/044 |
| | | | | 248/459 |
| 2012/0037047 A1* | 2/2012 | Moldovan | .............. | F16M 11/10 |
| | | | | 108/3 |
| 2012/0305739 A1* | 12/2012 | Huang | ................ | F16M 11/10 |
| | | | | 248/397 |
| 2016/0066667 A1* | 3/2016 | Yu | ................ | G06F 1/1628 |
| | | | | 224/191 |
| 2020/0060420 A1* | 2/2020 | Hu | ................ | A47B 23/043 |
| 2020/0397105 A1* | 12/2020 | Kim | ................ | A45C 11/00 |
| 2021/0310600 A1* | 10/2021 | Sawaqedy | .............. | F16M 11/38 |
| 2023/0346094 A1* | 11/2023 | Hsu | ................ | F16M 13/022 |

FOREIGN PATENT DOCUMENTS

| | | | | |
|---|---|---|---|---|
| CN | 211821384 U | * | 10/2020 | |
| CN | 214405480 U | * | 10/2021 | ........... A47B 23/043 |
| DE | 102021002347 A1 | * | 11/2022 | ........... A47B 23/044 |
| GB | 742152 A | * | 12/1955 | ............... G09F 1/00 |
| GB | 2449115 A | * | 11/2008 | ........... A47B 23/044 |
| WO | WO-2023030526 A1 | * | 3/2023 | |

* cited by examiner

SUPPORTING ASSEMBLY AND SUPPORTING FRAME THEREOF

TECHNICAL FIELD

The present utility model belongs to the field of supporting frames, and particularly relates to a supporting assembly and a supporting frame thereof.

BACKGROUND

Most of the existing supporting frames have a single and fixed structure, which cannot be folded or deformed, occupies a large space, and is inconvenient to carry.

Therefore, how to enable the supporting frame to support stably and how to fold and deform the supporting frame so as to reduce an occupied space and facilitate carrying are technical problems to be solved by those skilled in the art.

SUMMARY

A main technical problem solved by the present utility model is to provide a supporting assembly and a supporting frame thereof, so as to solve the problems that the supporting frame in the conventional technology is not firmly supported, occupies a large space, is inconvenient to carry, and cannot be folded and deformed.

To solve the above technical problems, a technical solution adopted by the present utility model is to provide a supporting frame, comprising:

a base plate, configured to support the supporting frame;

a connecting plate, configured to attach to and fix the base plate;

a back plate, wherein a first bending part is provided between the back plate and the connecting plate;

a supporting plate, wherein a second bending part is provided between the supporting plate and the back plate, a third bending part is provided between the supporting plate and the base plate, and the first bending part, the second bending part and the third bending part are parallel to each other; and when the supporting frame is bent and deformed through the first bending part, the second bending part and the third bending part, the supporting plate and the back plate are erected, the connecting plate is attached and connected to the base plate, and an included angle is formed between the supporting plate and the back plate.

Preferably, at least two dividing holes are provided between the connecting plate and the base plate to separate the first bending part, the second bending part and the third bending part.

Preferably, the dividing holes extend from the connecting plate to the base plate, an auxiliary supporting plate is formed between adjacent dividing holes in a dividing manner, and the auxiliary supporting plate is provided with a fourth bending part that allows the auxiliary supporting plate to be folded and attached.

Preferably, the fourth bending part is parallel to the first bending part.

Preferably, the dividing holes are parallel to each other, and the dividing holes are perpendicular to the first bending part, the second bending part and the third bending part.

Preferably, the included angle between the supporting plate and the back plate is in a range of 30° to 70°.

Preferably, the connecting plate and the base plate are provided at least partially with magnetic attraction layers that can attract each other.

Preferably, the connecting plate and the base plate are at least partially provided with a sticky adhesive layer.

Preferably, an adhesive fixing layer is provided at a bottom of the base plate.

The present utility model further discloses a supporting assembly, comprising a desktop stand and a supporting frame, wherein the supporting frame can be provided on a surface of the desktop stand, and the supporting frame is the supporting frame described above.

The present utility model has the following beneficial effects: disclosed is a supporting frame, comprising: a base plate, configured to support the supporting frame; a connecting plate, configured to attach to and fix the base plate; a back plate, wherein a first bending part is provided between the back plate and the connecting plate; a supporting plate, wherein a second bending part is provided between the supporting plate and the back plate, a third bending part is provided between the supporting plate and the base plate, and the first bending part, the second bending part and the third bending part are parallel to each other; and when the supporting frame is bent and deformed through the first bending part, the second bending part and the third bending part, the supporting plate and the back plate are erected, the connecting plate is attached and connected to the base plate, and an included angle is formed between the supporting plate and the back plate. The present utility model further discloses a supporting assembly. The supporting frame stably supports mobile devices and is deformed into a flat-plate shape, making it simple and portable.

DETAILED DESCRIPTION OF EMBODIMENTS

Figure 1:
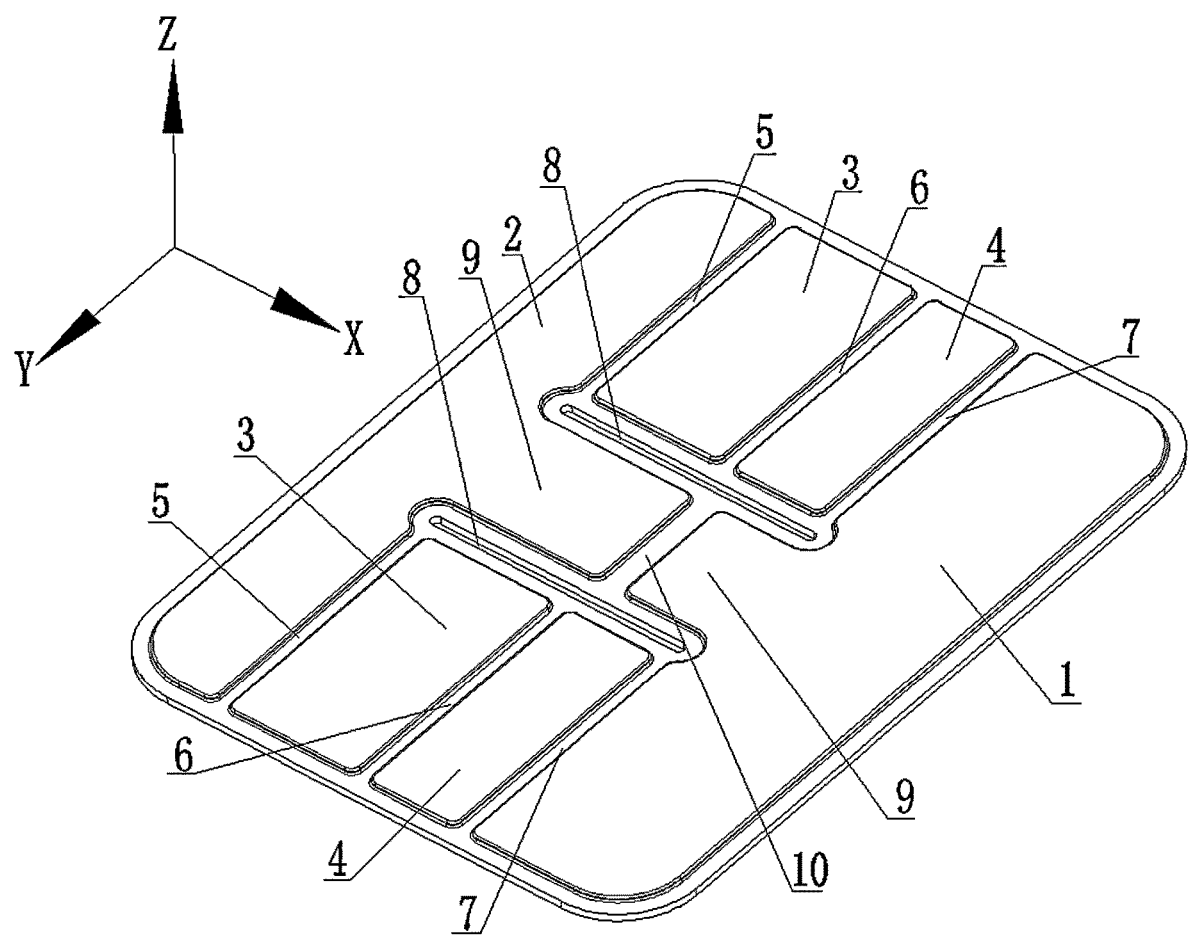
FIG. 1 is a schematic diagram of an embodiment of a supporting frame according to the present utility model.

To facilitate understanding of the present utility model, the present utility model will be further described in detail below in conjunction with the accompanying drawings and specific embodiments. Preferred embodiments of the present utility model are shown in the drawings. The present utility model may, however, be embodied in many different forms and is not limited to the embodiments described herein. Rather, these embodiments are provided so that this disclosure of the present utility model will be understood thoroughly and completely.

It should be noted that, unless otherwise defined, all technical and scientific terms used in this specification have the same meanings as those usually understood by those skilled in the art of the present utility model. The terms used in the specification of the present utility model are merely for the purpose of describing specific embodiments, and are not intended to limit the present utility model.

In the drawings, an arrow X indicates a front-rear direction, i.e., front-side and rear-side directions, an arrow Y indicates a lateral direction, i.e., left and right directions, and an arrow Z indicates a vertical direction, i.e., upper and lower directions.

Figure 2:
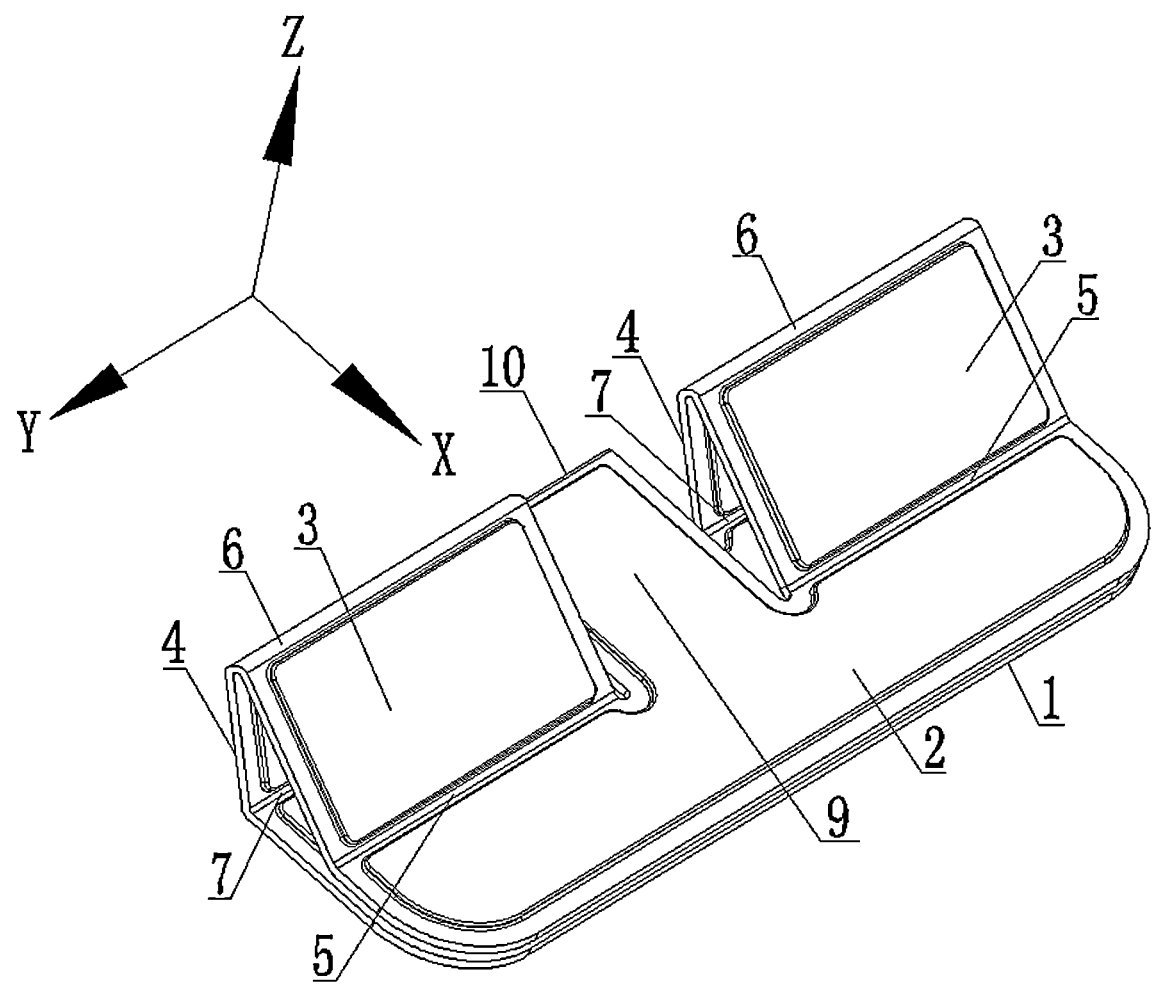
FIG. 2 is a schematic diagram of the folding and deformation of the embodiment shown in FIG. 1.
Figure 3:
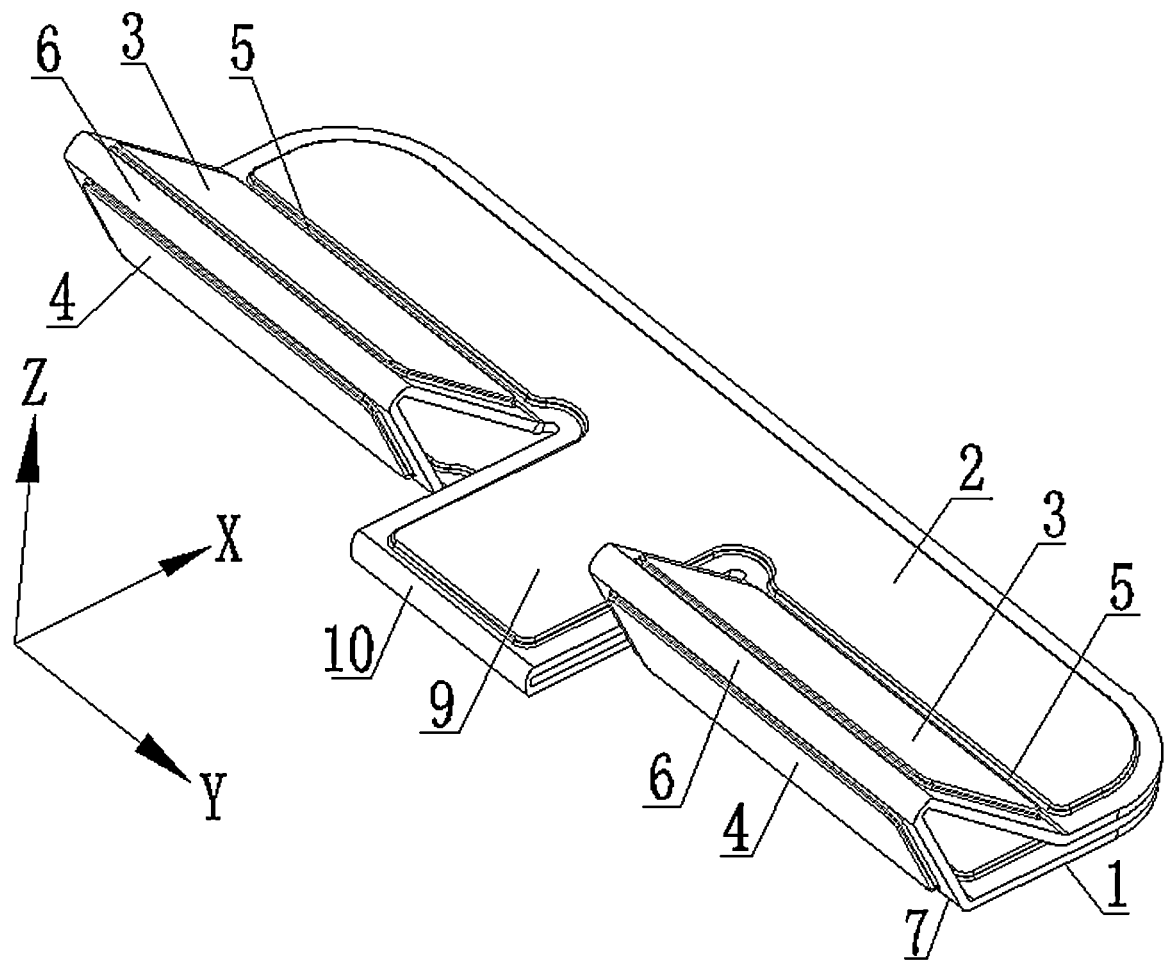
FIG. 3 is a schematic diagram of the embodiment shown in FIG. 2 from a rear view.

With reference to FIGS. 1, 2 and 3, the supporting frame comprises:

a base plate 1, configured to support the supporting frame and playing a role in stably supporting;

a connecting plate 2, configured to attach to and fix the base plate 1 to allow the entire supporting frame to be more solid and stable;

a back plate 3, wherein a first bending part 5 is provided between the back plate 3 and the connecting plate 2, that is, the first bending part 5 can be used for folding and deformation between the back plate 3 and the connecting plate 2;

a supporting plate 4, wherein a second bending part 6 is provided between the supporting plate 4 and the back plate 3, a third bending part 7 is provided between the supporting plate 4 and the base plate 3, and the first bending part 5, the second bending part 6 and the third bending part 7 are parallel to each other, so that the first bent part 5, the second bent part 6 and the third bent part 7 can be coordinated when being bent and deformed simultaneously; and when the supporting frame is bent and deformed through the first bending part, the second bending part and the third bending part, the supporting plate 4 and the back plate 3 are erected, the connecting plate 2 is attached and connected to the base plate 1, an included angle is formed between the supporting plate 4 and the back plate 3, the mobile device is supported by the erected back plate 3 and comprises a mobile phone, a tablet computer and a notebook computer, the back plate 3 can also support books, music scores and the like, and the erected supporting plate 4 can stably support the back plate 3, so that the supporting stability of the back plate 3 is enhanced.

Preferably, at least two dividing holes 8 are provided between the connecting plate 2 and the base plate 1 to separate the first bending part 5, the second bending part 6 and the third bending part 7. The arrangement of the dividing holes 8 can reduce the overall weight of the supporting frame. Meanwhile, when the back plate 3 supports the mobile device, the dividing holes 8 can also serve as heat dissipation holes.

Preferably, the dividing holes 8 are strip-shaped holes.

Preferably, the dividing holes 8 extend from the connecting plate 2 to the base plate 1, an auxiliary supporting plate 9 is formed between adjacent dividing holes 8 in a dividing manner, and the auxiliary supporting plate 9 is provided with a fourth bending part 10 that allows the auxiliary supporting plate to be folded and attached. The auxiliary supporting plates 9 can be bent and attached by the fourth bent part 10, which plays a role in enhancing the supporting stability of the supporting frame in the front-rear direction. Since the supporting frame is folded and deformed, the attached auxiliary supporting plates 9 are projected in the front-rear direction, that is, a supporting area in the front-rear direction is increased, thereby enhancing the supporting stability of the entire supporting frame in the front-rear direction. The connecting plate 2 and the base plate 1 have a supporting contact area with a long length in the lateral direction, so that the supporting stability of the supporting frame on the whole plane is improved.

Preferably, the fourth bending part 10 is parallel to the first bending part 5, so that the auxiliary supporting plate 9 can be bent and deformed more quickly along with the bending of the first bending part 5, the second bending part 6 and the third bending part 7, so that the bending and deformation speed of the entire supporting frame is increased.

Preferably, the dividing holes 8 are parallel to each other, and the dividing holes 8 are perpendicular to the first bending part 5, the second bending part 6 and the third bending part 7. The dividing holes 8 are parallel to each other, so that the auxiliary supporting plates 9 can have more contact areas when they are attached to each other, thereby enhancing the supporting capability.

Preferably, the included angle between the supporting plate 4 and the back plate 3 is in a range of 30° to 70°. An inclination angle of the back plate 3 is adjusted along with the change of the included angle between the supporting plate 4 and the back plate 3, so that the supporting angle of the supported mobile device is finally adjusted, and the supporting angle of the mobile device can be adjusted.

Preferably, the connecting plate 2 and the base plate 1 are provided at least partially with magnetic attraction layers that can attract each other, so that the connecting plate 2 and the base plate 1 can be attracted and attached quickly.

Preferably, the connecting plate 2 and the base plate 1 are at least partially provided with a sticky adhesive layer, so that the connecting plate 2 and the base plate 1 are fixed and attached quickly.

Preferably, a material of the supporting frame comprises leather or plastic.

Preferably, an adhesive fixing layer is provided at a bottom of the base plate 1. A size and shape of the adhesive fixing layer are the same as those of the base plate 1, or the adhesive fixing layer extends out of the base plate 1, that is, an area of the adhesive fixing layer is greater than that of the base plate 1, so that the supporting frame can be more firmly adhered and fixed. The adhesive fixing layer is arranged to enable the supporting frame to be fixed on a vertical plane (such as a wall) so as to support an object on the vertical plane.

Figure 4:
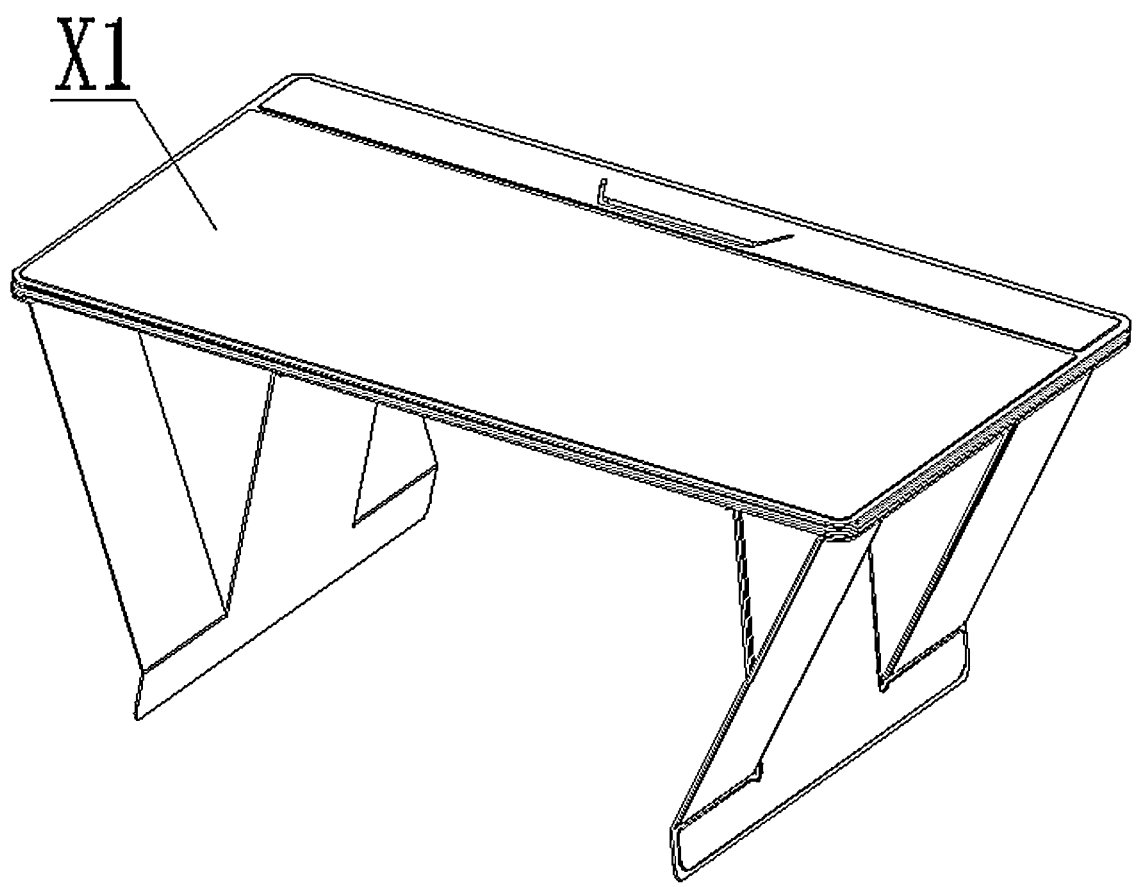
FIG. 4 is a schematic diagram of a desktop stand in another embodiment of a supporting frame according to the present utility model.

With reference to FIGS. 2 and 4, the present utility model discloses a supporting assembly, comprising a desktop stand X1 and a supporting frame, wherein the supporting frame can be provided on a surface of the desktop stand X1, and the supporting frame is the supporting frame described above.

Based on the foregoing embodiments, the present utility model provides a supporting frame, comprising: a base plate, configured to support the supporting frame; a connecting plate, configured to attach to and fix the base plate; a back plate, wherein a first bending part is provided between the back plate and the connecting plate; a supporting plate, wherein a second bending part is provided between the supporting plate and the back plate, a third bending part is provided between the supporting plate and the base plate, and the first bending part, the second bending part and the third bending part are parallel to each other; and when the supporting frame is bent and deformed through the first bending part, the second bending part and the third bending part, the supporting plate and the back plate are erected, the connecting plate is attached and connected to the base plate, and an included angle is formed between the supporting plate and the back plate. The present utility model further discloses a supporting assembly. The supporting frame stably supports mobile devices and is deformed into a flat-plate shape, making it simple and portable.

The above mentioned contents are merely embodiments of the present utility model and are not intended to limit the patent scope of the present utility model. The equivalent structural transformations made by using the contents of the specification and the drawings of the present utility model, or direct or indirect applications to other related technical fields, are all included in the patent protection scope of the present utility model.

The invention claimed is:

1. A supporting frame, comprising:
a base plate, configured to support the supporting frame;
a connecting plate, configured to attach to and fix the base plate;
a back plate, wherein a first bending part is provided between the back plate and the connecting plate;
a supporting plate, wherein a second bending part is provided between the supporting plate and the back plate, a third bending part is provided between the supporting plate and the base plate, and the first bending part, the second bending part and the third bending part are parallel to each other; and
wherein at least two dividing holes are provided between the connecting plate and the base plate to separate the first bending part, the second bending part and the third bending part;
wherein the dividing holes extend from the connecting plate to the base plate, auxiliary supporting plates are formed between adjacent dividing holes in a dividing manner, and the auxiliary supporting plates are provided with a fourth bending part that allows the auxiliary supporting plates to be folded and attached; and the auxiliary supporting plates are integrally connected with both the base plate and the connecting plate;
when the supporting frame is bent and deformed through the first bending part, the second bending part, the third bending part and the forth bending part, the supporting plate and the back plate are erected, the connecting plate is attached and connected to the base plate, the auxiliary supporting plates are folded and attached, and an included angle is formed between the supporting plate and the back plate; and
during use, bottom surfaces of both the base plate and the auxiliary supporting plates are attached to a same external plane, while the erected back plate is configured to conform to a rear surface of a mobile device and provides structural support.

2. The supporting frame according to claim 1, wherein the fourth bending part is parallel to the first bending part.

3. The supporting frame according to claim 2, wherein the dividing holes are parallel to each other, and the dividing holes are perpendicular to the first bending part, the second bending part and the third bending part.

4. The supporting frame according to claim 3, wherein the included angle between the supporting plate and the back plate is in a range of 30° to 70°.

5. The supporting frame according to claim 1, wherein the connecting plate and the base plate are provided at least partially with magnetic attraction layers that can attract each other.

6. The supporting frame according to claim 1, wherein the connecting plate and the base plate are at least partially provided with a sticky adhesive layer.

7. The supporting frame according to claim 1, wherein an adhesive fixing layer is provided at a bottom of the base plate.

* * * * *